Patented Jan. 12, 1932

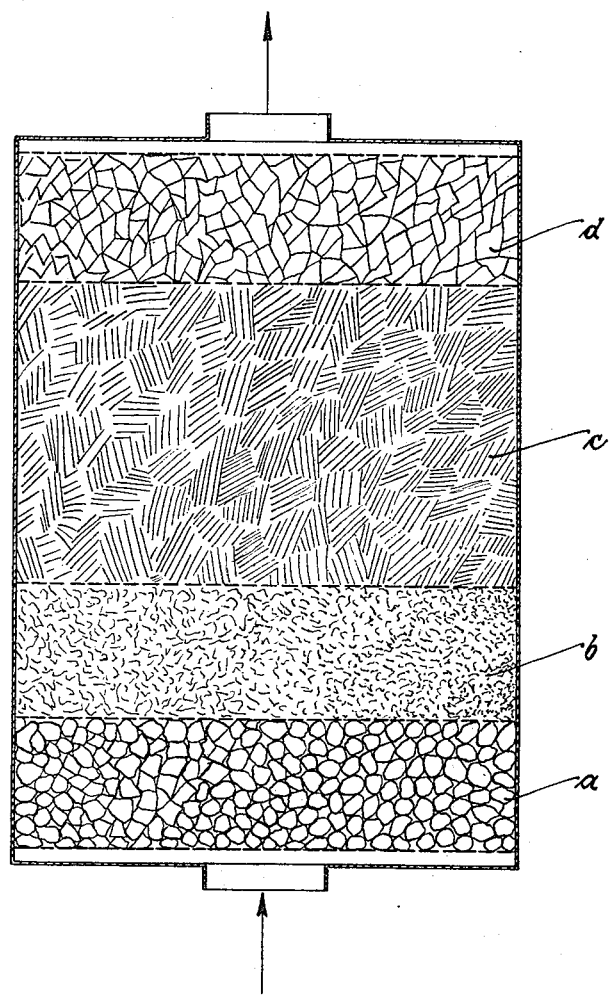

1,840,611

UNITED STATES PATENT OFFICE

GERHARD KARL EMIL HEINRICH STAMPE, OF LUBECK, GERMANY, ASSIGNOR TO OTTO HEINRICH DRÄGER, OF LUBECK, GERMANY

METHOD AND APPARATUS FOR PROTECTING A CATALYTICALLY ACTING OR PURIFYING MATERIAL AGAINST CONTACT POISONS

Application filed November 5, 1929, Serial No. 405,047, and in Germany November 19, 1928.

Air purifying materials, for instance, such used in canisters for breathing implements are known to act in a catalytic way. Such purifying materials have the peculiarity, that they are inclined to become ineffective by certain contact poisons contained in the air to be purified. Therefore they must be protected by depriving the stream of air before entering the purifying material from the contact poisons contained therein. Steam or water vapor is a contact poison, for instance, for the catalyst for oxydizing carbon monoxide, known as hopcalite. The air passing the catalyst is usually prepared by removing the water vapor by a drying layer, for instance chloride of calcium. Moreover, it is known to produce by the aid of the contact poisons a warning material adapted, for instance by irritating the nose, the lungs or the throat to indicate thus the deterioration of the catalyst.

Contrary to this procedure the new invention stipulates that a current of air containing contact poisons, which is to be purified, is subjected to one or more substances, which destroy the contact poisons before the air enters the catalytically acting material, which substances change or partly change these poisons into a warning substance retained by the duly working catalyst. With a material catalytically oxidizing carbon oxide, for which water vapor is a contact poison, the method is carried out by arranging in front of the air purifying material a drying layer, the drying effect of which consists both in removing the water vapor and in simultaneously producing a warning substance. Such a drying layer may consist by way of example of calcium carbide or another light metal carbide which in contact with water vapor develops acetylene or a similar hydrocarbon. Thus the air when entering the canister first comes into contact with the drying layer. According to this invention this drying material (such as calcium chloride, for instance) takes the water vapor from the air and at the same time gives off a hydrocarbon (acetylene in this case). This hydrocarbon is oxydized while the catalyst is working properly. When the catalyst is breaking down, however, the hydrocarbon passes the canister and warns the person working under the mask by the smell or by the irritating effect on the breathing passages.

In the drawing a breathing canister is shown in vertical section to which the invention is applied.

In this box the air purifying material, for instance a catalyst oxydizing carbon oxide, is designated with $c$. The direction of the stream of air is indicated by arrows. Before meeting the purifying material $c$ the air passes through a layer $b$, for instance calcium carbide. The two outer layers $a$ and $d$ are formed of calcium chloride. As $a$ and $d$ are only for the protection of the other layers and not of importance for this invention in the following explanation the canister will be supposed to contain only the layers $b$ and $c$. For the catalyst $c$ water vapor is a contact poison which is always contained in the air to be purified. The air containing carbon oxide and water vapor enters the canister from below in the direction of the arrow. In the layer of calcium carbide $b$ the water vapor is held back, because the calcium carbide is a very excellent drying means. When combining with water it produces acetylene. Thus only carbon oxide and acetylene enter together with the air the layer $c$. These impurities are destroyed by a catalytic oxydation, so that only non-poisonous air leaves the upper end of the canister. When, however, the drying layer $b$ begins to be exhausted, it is no longer able to turn all the water vapor into acetylene. The consequence is, that air passes, from $b$ into $c$, which besides acetylene contains still some water vapor, which latter is apt to make the purifying material $c$ ineffective.

By absorbing the water vapor the catalyst loses at the same time the capacity to oxydize the total amount of carbon oxide and acetylene entering it. Consequently the air escaping from the cartridge is no more fully purified, but still contains acetylene besides carbon oxide. The carbon oxide is, it is true, inodorous, but the impure acetylene being generated by the technical calcium carbide is noticed by the smell. The wearer of the breathing mask will thus be notified of the exhaust or the beginning of the exhaust of the purifying material.

The layer $d$ of the calcium chloride has the purpose to prevent the entrance of water vapor from the upper end of the canister, and the layer $a$ of calcium chloride may be used, if there is the possibility that the amount of water in the air is very large. It only removes part of the vapor before the air enters the layer $b$ to prevent the amount of developed acetylene from becoming too large and the catalyst $c$ from enduring too heavy a strain. The layer $a$ may be left away without disturbing the action of the here described device. When the protective layer $d$ is exhausted or when no protection is used at the top of the canister it may happen that some water vapor enters the catalyst $c$ and affects the latter to a slight degree, then there will be no indication of an exhaust which in fact in such case is not necessary.

Such exhaust, however, will be indicated, if the catalyzing material is made ineffective not by water vapor but by other means, either during storage or during operation of the canister.

I claim:—

1. In an air purifying cartridge containing a layer of catalytic purifying material, a layer of dehydrating material disposed on the inlet side of said catalytic purifying material, said de-hydrating material being adapted to combine with the moisture of the contaminated air to form a warning gas capable of being removed by said catalytic purifying material when active but passing through the same when exhausted.

2. In an air purifying cartridge containing a layer of catalytic purifying material for which water vapor is a contact poison, a layer of material capable of reacting with the moisture in the contaminated air being treated to form a warning gas adapted to be removed by said catalytic purifying material when active but adapted to pass through the same when exhausted, said layer reacting to form the warning gas being disposed on the inlet side of the layer of catalytic purifying material.

3. In an air purifying cartridge containing a layer of catalytic purifying material for which water is a contact poison, dehydrating means in the path of the contaminated air to be purified on the inlet side of said purifying layer, said dehydrating means including a substance adapted to react with the moisture in the contaminated air to form a warning gas capable of being removed by said purifying material when active but passing through the layer of purifying material when the same is exhausted.

4. In an air purifying cartridge containing a layer of catalytic material for oxidizing carbon monoxide and for which water vapor is a contact poison disposed in the path of moisture containing contaminated air to be purified, a layer of material containing a light metal carbide also disposed in the path of the air to be purified and positioned on the inlet side of the aforesaid layer of catalytic material.

5. A purifying cartridge comprising a layer of light metal carbide in the path of moisture containing contaminated air to be purified, and a layer of catalytic purifying material also disposed in said path on the outlet side of the carbide layer, the reaction product of the moisture in the contaminated air and the carbide being oxidized in the presence of said catalytic material when active but passing therethrough when the same is exhausted.

6. Device as claimed in claim 5 wherein the light metal carbide is calcium carbide.

7. Method of purifying air containing moisture which comprises passing the same in contact with a dehydrating agent, and then passing it in contact with a purifying catalyst, the dehydrating agent being of such a nature that at least a portion thereof reacts with the moisture of the contaminated air to form a product removable in the presence of said catalyst when active.

8. Method as claimed in claim 7 wherein the reaction product of the moisture in the contaminated air and the dehydrating agent constitutes a warning gas.

In testimony whereof I have signed my name to this specification.

GERHARD KARL EMIL HEINRICH STAMPE.